M. P. PEDERSEN AND P. C. PETERSEN.
INTERNAL BEARING STRUCTURE.
APPLICATION FILED NOV. 17, 1919.
1,362,733.
Patented Dec. 21, 1920.
3 SHEETS—SHEET 2.
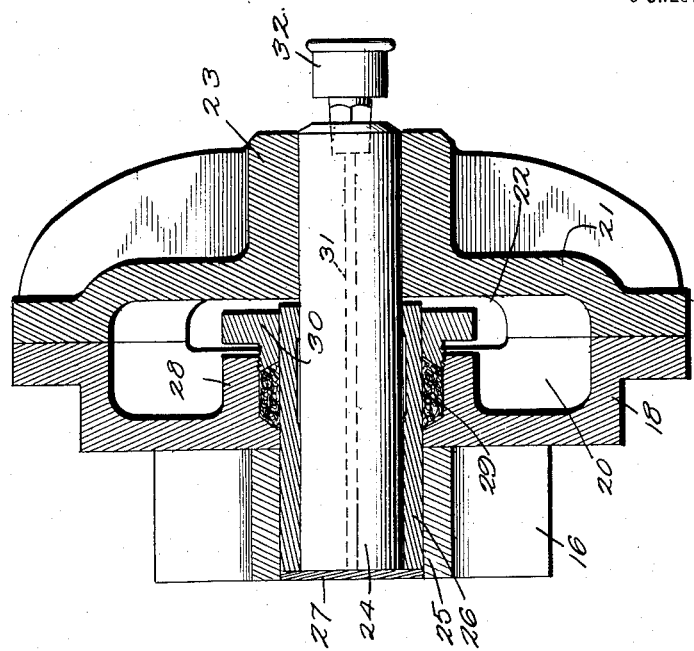
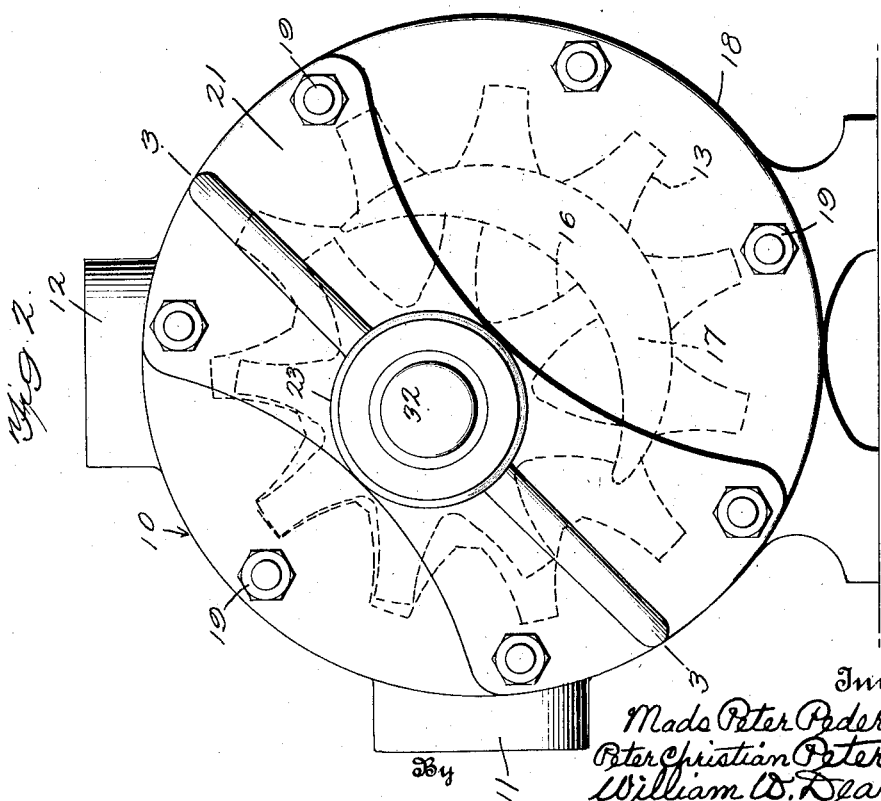
Inventors
Mads Peter Pedersen
Peter Christian Petersen
William W. Deane
Their Attorney M. P. PEDERSEN AND P. C. PETERSEN.
INTERNAL BEARING STRUCTURE.
APPLICATION FILED NOV. 17, 1919.

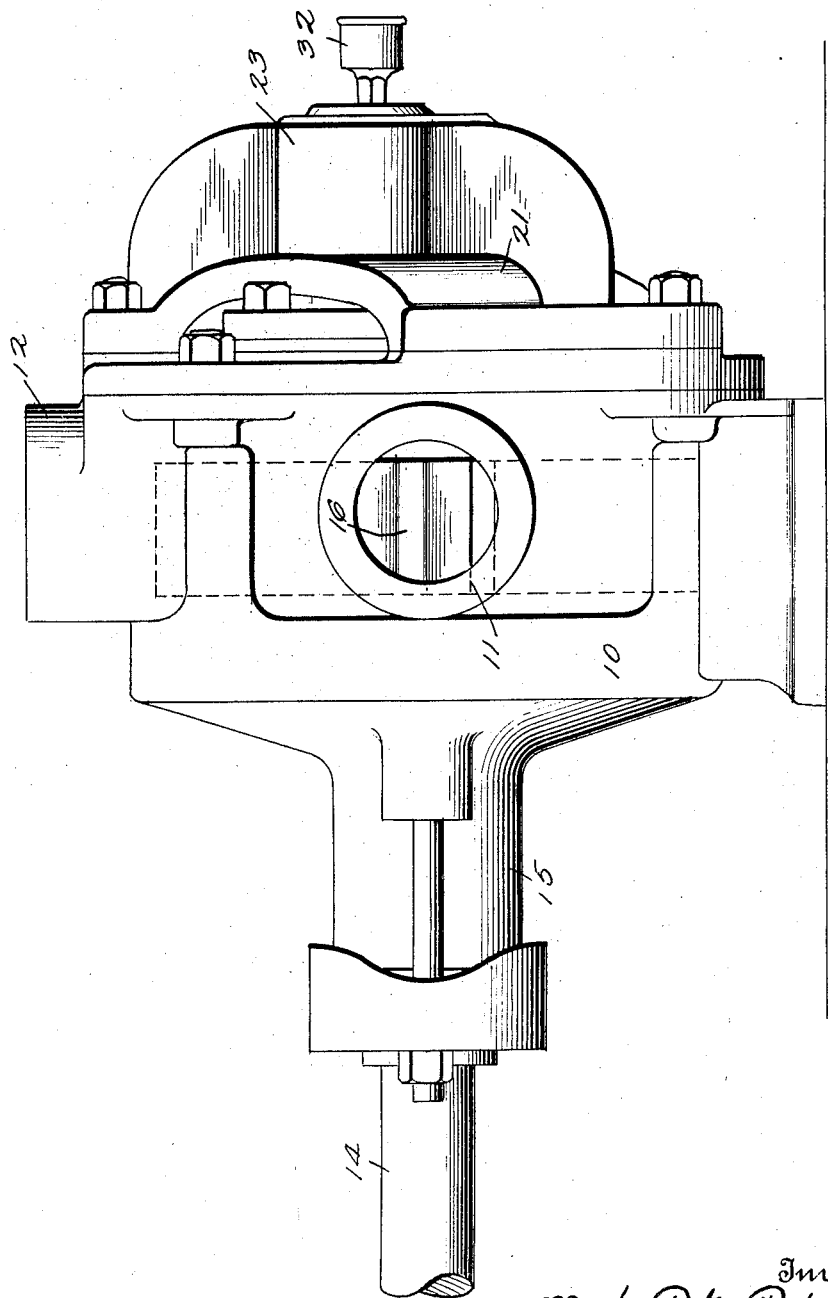

1,362,733.

Patented Dec. 21, 1920.

3 SHEETS—SHEET 3.

Inventors
Mads Peter Pedersen
Peter Christian Petersen
William D. Deane
Their Attorney

UNITED STATES PATENT OFFICE.

MADS PETER PEDERSEN AND PETER CHRISTIAN PETERSEN, OF CEDAR FALLS, IOWA, ASSIGNORS TO VIKING PUMP COMPANY, OF CEDAR FALLS, IOWA.

INTERNAL BEARING STRUCTURE.

1,362,733.   Specification of Letters Patent.   Patented Dec. 21, 1920.

Application filed November 17, 1919. Serial No. 338,728.

*To all whom it may concern:*

Be it known that we, MADS PETER PEDERSEN and PETER CHRISTIAN PETERSEN, citizens of the United States, residing at Cedar Falls, in the county of Blackhawk and State of Iowa, have invented certain new and useful Improvements in Internal Bearing Structures, of which the following is a specification.

Our invention relates to an internal bearing structure for the idler or rotary pinion of a pump, while not necessarily restricted to this use.

An important object of the invention is to provide a bearing structure of the above mentioned character, so constructed that the water under pressure is effectually prevented from entering the interior thereof, and the same may be properly lubricated, without the employment of high pressure grease cups, or the like.

A further object of the invention is to provide a structure of the above mentioned character which will permit of the employment of ball bearings, and is adapted to withstand the high pressure applied to the idler.

A further object of the invention is to provide a device of the above mentioned character, which is simple in construction, inexpensive to manufacture, strong and durable.

Other objects and advantages of the invention will be apparent during the course of the following description.

Figure 5:
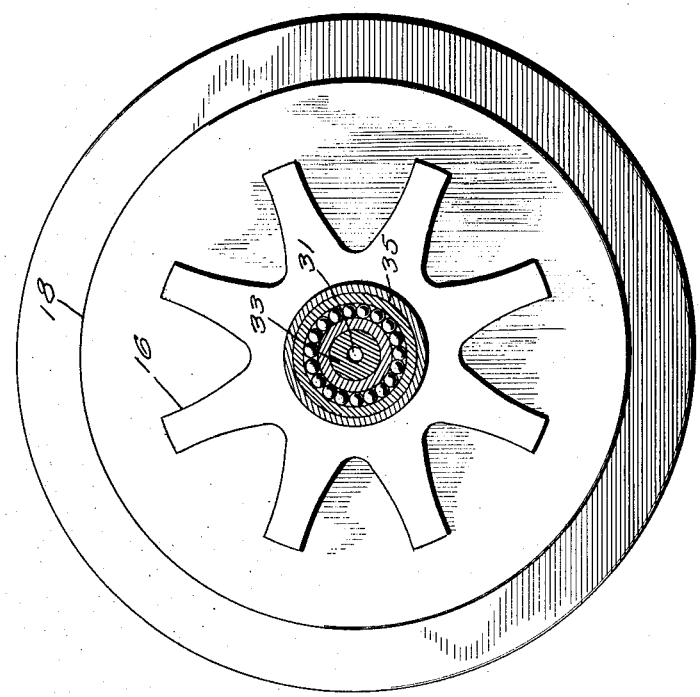
Figure 4:
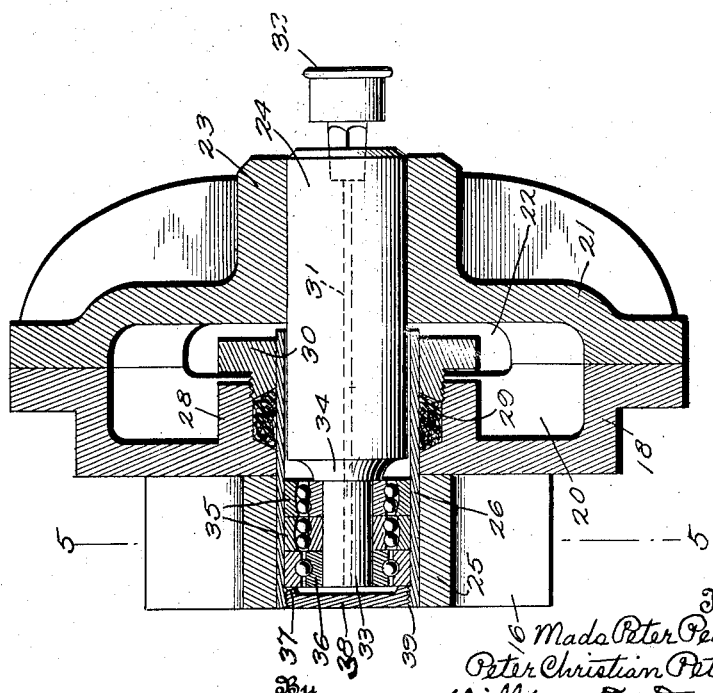

In the accompanying drawings forming a part of this specification, and in which like numerals are employed to designate like parts throughout the same, Figure 1 is a side elevation of a pump having our improved internal bearing structure embodied therein, Fig. 2 is an end elevation of the same, Fig. 3 is a longitudinal section through the bearing structure, taken on line 3—3 of Fig. 2, parts of the pump being omitted, Fig. 4 is a similar view showing the bearing structure as embodying ball bearings, and, Fig. 5 is a transverse section taken on line 5—5 of Fig. 4.

In the drawings, wherein for the purpose of illustration is shown a preferred embodiment of our invention, the numeral 10 designates the casing of a rotary pump, of any well known or preferred type, such as the "Viking" pump. The casing 10 may be considered as having a normal inlet 11 and outlet 12, but these elements have their function reversed when the rotor or driving pinion has its direction of rotation reversed. The numeral 13 designates the rotor or driving pinion, arranged within the casing 10, and connected with or mounted upon a drive shaft 14, operating through a stuffing box 15. This drive shaft may receive its rotation from any suitable source of power. The numeral 16 designates the idler or driven pinion, in mesh with the teeth of the rotor, and driven thereby, the rotor being in effect an internal gear. The idler 16 operates in proximity to a crescent shaped abutment 17, held stationary within the casing. The foregoing description is that of the construction of the well known pump, and it is thought that the same is sufficient for the purpose of illustrating the application of the present invention.

The numeral 18 designates a cover plate or head, bolted to one end of the casing 10, as shown at 19. This cover plate is preferably offset inwardly, providing an exterior chamber or recess 20. A bracket or support 21 is arranged upon the exterior of the cover plate 20, and is held in place by certain of the bolts 19. The bracket 21 affords openings 22, at the sides, which lead to the atmosphere, exteriorly of the casing 10. A sleeve or collar 23 is rigidly secured to the bracket 21, and is preferably formed integral therewith.

Our improved bearing structure comprises an idler pin 24, preferably horizontally arranged, and having its outer end held within the collar 23, and preferably clamped therein against movement with relation to the same. This idler pin projects through the cover plate 18 and enters the interior of the casing 10. The idler or driven pinion 16 has a tubular hub 25 which is rigidly mounted upon an idler sleeve 26 or said sleeve may be made integral with the idler. This idler sleeve is rotatably mounted upon the stationary idler pin 24, and projects outwardly beyond the hub 25 for a substantial distance, and leads to the interior of the bracket 21, exteriorly of the casing 10. A disk 27 is arranged at the inner ends of the idler sleeve 26, and may be held in place by any suitable means or the said disk 27 may be made integral with the idler hub 25 and the idler sleeve 26 and serves to prevent any of the water or other liquid under pressure passing into the inner end of the sleeve 26, between it and the pin 24.

The sleeve 26 is rotatable with the idler 16, and operates within a stuffing box 28, formed upon the exterior of the cover plate 18, and receiving packing 29, held in place by a gland 30. The function of this stuffing box and packing is to prevent the liquid under pressure from escaping exteriorly of the sleeve 26 but any small amount of liquid which may pass through the stuffing box, will discharge into the bracket 21, at the end of the sleeve 26.

The pin 24 is provided with a longitudinal port 31, for the passage of a lubricant, this port discharging at its forward or inner end behind the disk 27. The lubricant is supplied to the port 31 from a grease cup 32, as shown.

In Figs. 4 and 5, a slightly different form of the device is shown. The idler pin 24 is provided at its forward end with a reduced portion 33, with a shoulder 34 at the rear end of this reduced portion. The idler 16 has its hub 25 rigidly secured to or made integral with the sleeve 26, as in Fig. 3, but ball bearings 35 and 36 are interposed between the forward end of the sleeve and the reduced portion 33. The inner ball bearings 35 are of the radial type, while the ball bearing 36 is of the thrust type, and is adapted to engage the annular flange 37 of a disk 38, which is screw-threaded or otherwise rigidly secured into the inner end of the sleeve 26, as shown at 39. This disk therefore serves to exclude the entrance of all liquid under pressure, into the inner end of the sleeve 26. The port 31 will supply the lubricant to the ball bearings, as is obvious. All other parts of the device remain the same as described in connection with Fig. 3.

In view of the foregoing description it is thought to be obvious that the applicants have provided an internal bearing structure for the idler of the pump, for suitably supporting the same, and which is so constructed that the liquid can not pass into the bearing structure, and thereby destroy or wash out the lubricant.

It is to be understood that the forms of our invention herewith shown and described are to be taken as preferred examples of the same, and that various changes in the shape, size, and arrangement of parts may be resorted to without departing from the spirit of our invention, or the scope of the subjoined claims.

Having thus described our invention, we claim:—

1. In a pump of the character described, a casing member having a stuffing box, a bracket connected with the casing member and arranged exteriorly thereof, a pin extending through the stuffing box and secured to the bracket, a sleeve rotatable upon the pin and extending between the pin and the stuffing box, an idler secured upon the sleeve, and means for completely closing the inner end of the sleeve.

2. In a pump of the character described, a casing member having a stuffing box, a bracket connected with the exterior of the casing member and provided with a collar, a pin clamped within the collar and extending through the stuffing box to enter the casing, a sleeve rotatable upon the pin and extending between the same and the stuffing box, an idler rigidly secured to the inner end of the sleeve for rotation therewith, a disk engaging the inner end of the sleeve to completely close it, and means for supplying a lubricant to the interior of the sleeve.

3. In a pump of the character described, a casing member having a stuffing box, a bracket connected with the exterior of the casing member, a pin rigidly connected with the bracket and extending through the stuffing box, said pin having a longitudinal port for the passage of a lubricant, means to supply a lubricant to the port, a sleeve rotatable upon the pin and arranged between it and the stuffing box, an idler secured to the inner end of the sleeve, and a disk completely closing the inner end of the sleeve.

4. In a pump of the character described, a casing member having a stuffing box, a sleeve having its outer portion rotatable within the stuffing box, a pin having its inner portion projecting into the sleeve and its outer portion extending beyond the same, means to hold the pin against displacement, ball bearings arranged within the sleeve between it and the pin, a disk to completely close the inner end of the sleeve, and an idler arranged upon the sleeve and supported thereby.

5. In a pump of the character described, a casing member having a stuffing box, a sleeve having its outer portion rotatable in the stuffing box, a pin having its forward portion arranged within the sleeve and provided with a reduced portion, ball bearings carried by such reduced portion and engaging the sleeve, a disk closing the inner end of the sleeve, an idler arranged upon the sleeve, and means connected with the outer end of the pin to hold it against displacement.

In testimony whereof we affix our signatures.

MADS PETER PEDERSEN.
PETER CHRISTIAN PETERSEN.